(12) United States Patent
Färkkilä

(10) Patent No.: US 7,376,667 B2
(45) Date of Patent: May 20, 2008

(54) INFORMATION SYSTEM

(75) Inventor: Kalle Johannes Färkkilä, Helsinki (FI)

(73) Assignee: Polyadaptive IPR Oy, Espoo (FI)

( * ) Notice: Subject to any disclaimer, the term of this patent is extended or adjusted under 35 U.S.C. 154(b) by 405 days.

(21) Appl. No.: 10/984,906

(22) Filed: Nov. 10, 2004

(65) Prior Publication Data

US 2006/0101057 A1     May 11, 2006

(51) Int. Cl.
*G06F 17/00* (2006.01)
(52) U.S. Cl. .............. 707/102; 707/7; 707/10; 707/104.1; 709/217
(58) Field of Classification Search .......... 707/1–10, 707/100–104.1, 200–206; 709/203, 217, 709/219, 224, 225; 705/2
See application file for complete search history.

(56) References Cited

U.S. PATENT DOCUMENTS

| 6,631,370 | B1 | 10/2003 | Pekkanen |
| 6,985,902 | B2 * | 1/2006 | Wise et al. .............. 707/10 |
| 2002/0035486 | A1 | 3/2002 | Huyn et al. |
| 2004/0205064 | A1 | 10/2004 | Zhou et al. |

FOREIGN PATENT DOCUMENTS

WO     WO 02/25486     3/2002

OTHER PUBLICATIONS

Noel Bryson et al., Supporting team decision-making with consensus-relevant information, 1997, IEEE, 57-63.*
Rachid Guerraoui etal., The Information Structure of Indulgent Censensus, Apr. 2004, IEEE, 453-466.*
Price Waterhouse Coopers publication Eccles, Herz, Keegan, Phillips, "The Value Reporting Revolution", ISBN 0-471- 39879-9, pp. 123-142.

* cited by examiner

*Primary Examiner*—Jean B Fleurantin
(74) *Attorney, Agent, or Firm*—Young & Thompson

(57) ABSTRACT

An information system, comprising a workstation, a database, and connection means for providing access to the database from the workstation. The database comprises a plurality of predefined attributes arranged into a predefined hierarchical order, each attribute corresponding to an assessable factor. The connection means are configured to receive from a user a set of values, the values describing the user's perception on the valued attributes, update the received values into consensus values of the attributes, and provide the user with access to the consensus values of the attributes valued by him. An advantage of the method and arrangement of the invention is that it provides a new enhanced tool for collecting and distributing consensus information.

24 Claims, 4 Drawing Sheets

Fig. 6

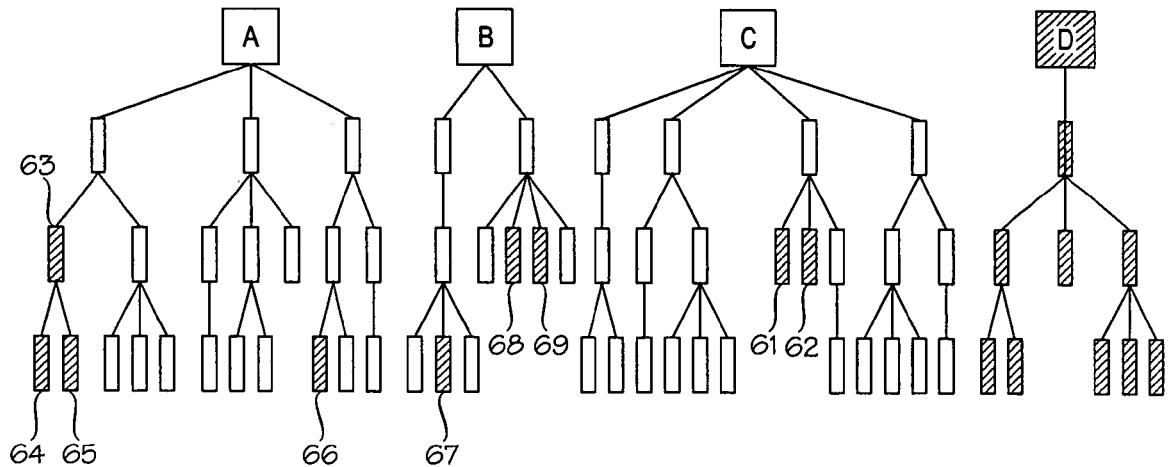

Fig. 8

| R₁₁ N₁₁ | R₂₁ N₂₁ | R₃₁ N₃₁ | R₄₁ N₄₁ | R₅₁ N₅₁ | R₆₁ N₆₁ | R₇₁ N₇₁ | R₈₁ N₈₁ | R₉₁ N₉₁ | R₁₀₁ N₁₀₁ |
|---|---|---|---|---|---|---|---|---|---|
| R₁₂ N₁₂ | R₂₂ N₂₂ | R₃₂ N₃₂ | R₄₂ N₄₂ | R₅₂ N₅₂ | R₆₂ N₆₂ | R₇₂ N₇₂ | R₈₂ N₈₂ | R₉₂ N₉₂ | R₁₀₂ N₁₀₂ |
| R₁₃ N₁₃ | R₂₃ N₂₃ | R₃₃ N₃₃ | R₄₃ N₄₃ | R₅₃ N₅₃ | R₆₃ N₆₃ | R₇₃ N₇₃ | R₈₃ N₈₃ | R₉₃ N₉₃ | R₁₀₃ N₁₀₃ |
| R₁₄ N₁₄ | R₂₄ N₂₄ | R₃₄ N₃₄ | R₄₄ N₄₄ | R₅₄ N₅₄ | R₆₄ N₆₄ | R₇₄ N₇₄ | R₈₄ N₈₄ | R₉₄ N₉₄ | R₁₀₄ N₁₀₄ |
| R₁₅ N₁₅ | R₂₅ N₂₅ | R₃₅ N₃₅ | R₄₅ N₄₅ | R₅₅ N₅₅ | R₆₅ N₆₅ | R₇₅ N₇₅ | R₈₅ N₈₅ | R₉₅ N₉₅ | R₁₀₅ N₁₀₅ |

Fig. 10

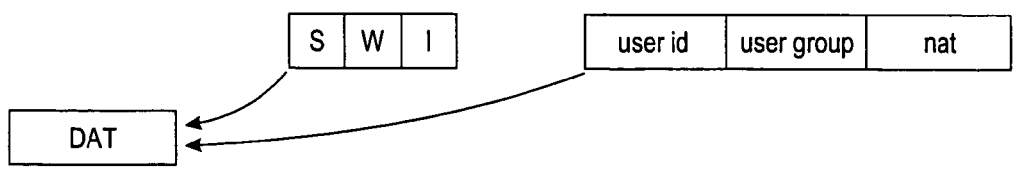

INFORMATION SYSTEM

FIELD OF THE INVENTION

The invention relates to information systems, and more particularly to an information system for providing collective consensus information.

BACKGROUND OF THE INVENTION

By definition, consensus reflects an agreement in the judgment or opinion reached by a group as a whole. This means that consensus is essentially associated with human perception and, contrary to the more axiomatic conclusions, typically involves a semantic aspect. This has traditionally made consensus very difficult to manage and practical tools for modeling and thereby utilizing consensus information do not currently exist.

As an example, in the equity market, the decisions whether to sell or buy are typically made quickly, primarily based on the latest information available on the company in question and often through an intuitive and instantaneous interpretation on the validity of that information.

The listed companies are strictly obliged to release defined types of news directly to the markets, but most of this information deals with economical fundamentals and technical analysis, which are inherently numeral facts and therefore quite easily applicable in comprehensive analysis. With a brief look at the values of the stock it is, however, clear that valuation of a listed company must be based on a considerably larger amount of factors than the purely metric criteria currently in use.

Price Waterhouse Coopers publication Eccles, Herz, Keegan, Phillips: "The Value Reporting Revolution", ISBN 0-471-39879-9, pages 123-142, summarizes a list of value drivers prioritized by the analysts from several countries and from different types of operators. From the results, it may be determined that several of the most valued criteria relate to factors that are not directly related to the fundamentals or neither derivable thereof. On the contrary, they typically represent the intangible and immaterial factors that do not inherently translate into numeral values but, nevertheless, form a continuously increasing portion of the total value of the company. Examples of such other relevant factors comprise the competitive position of the company, turnover of employees, versatility of product map, performance of logistic system, appreciation of the brand, performance of the management, strategic policies, customer satisfaction, quality record, etc. Furthermore, reflecting the general attitude, most of the respondents considered themselves well informed on the fundamentals but significantly less informed on the other relevant factors. This disadvantage works actually in two ways: the companies are not aware of the factors that the interested parties would consider relevant and thus do not actively publicize such material.

The common aspect of these factors is that, even though they do not directly lend themselves for numerical computations, in one way or another they involve the human perception, and therefore can be approached and/or approximated by means of consensus information.

Similar type of application areas, where opinions and perceptions are relevant, and thus consensus information is applicable, cover a lot of areas. Collection and analysis of consensual opinion information of multiple properties and for a variety of purposes may be used for evaluating, for example products (such as cars, appliances, tools, equipment, books etc.), services (hotels/lodging, restaurant/dining, attorney/legal, airline/transport, ad-agency/design etc.), organizations (business companies, educational institutes, political parties etc.), and individual persons (skillset, work history etc.)

Prior art solutions for collecting and distributing consensus information comprise essentially two categories: research and questionnaires. In the first type the consensus is essentially based on recommendations released by banking companies and other interest groups. The information in the public and/or purchased recommendations, and interviews is collected from a variety of sources and compiled into a research result. This procedure is extremely laborious and a produces one-time result that wears quickly off in the course of time. In the second type, the consensus is based on questionnaires that are provided in an electronic format (typically a table) to a defined interest group, for example subscribers of a professional magazine. The responses are compiled into numerical representations illustrating the consensus or the respondents. Also these questionnaires provide only one-time results that begin to expire right after their release. Furthermore, the people of profession are focused and tend not to be keen on spending time and energy on targets and factors they are not interested in, and thus ignore a lot of questionnaires that continuously flow in.

Consequently, an essential problem in the prior art solutions is the overall validity of the consensus information. Validity in this context has several aspects, which tend to be compromised in various ways. Firstly, the relevance of the consensus corresponds directly with the number of the members of the group that provides the assessments. A consensus of one is merely an opinion and a consensus of two may represent an understanding or a disagreement; thus only with several evaluators the consensus can be considered to truly reflect the general perception on the evaluated factor.

Secondly, the contentual validity of the information deals with semantics and scopes of interest. Lacking the axiomatic basis, the interesting factors may be, and often are, described and defined differently by different entities or interest groups. For example, banking companies typically utilize their own in-house parameters and criteria that do not directly correspond with questions posed by external researchers. It is clear that giving heuristic opinions on constantly varying and obscure definitions is neither productive nor interesting to the people of profession. The same disadvantage concerns the validity in terms of scope of interest: the most skilled evaluators with the best knowledge are often very busy and do not want to waste their time on evaluating or analyzing companies or factors that they personally do not have any interest in. Additionally, the evaluation of relevance of the topics is typically based on the perception of the party that releases the research. Due to the wide variety of the evaluated subjects and the complex nature of the cumulative conceptions of the participators, the validity of the topics may often be questionable from the point of view of the majority of the participators.

Thirdly, the representativeness of the consensus values decreases with time, gradually as well as in response to abrupt changes in the operative environment or internal operations. Immaterial factors and intangible information has typically no regulated posts where it officially should be mandatorily released. For example, the numerical information related to the fundamentals is distributed at least annually, but there is no obligation to the company to inform, for example, on a walkout of the marketing department, or dissolution of long-term co-operation with a recognized expeditor. For truly valid consensus information there should thus be means for effectively control the lifetime of the utilized assessments.

BRIEF SUMMARY OF THE INVENTION

An object of the present invention is thus to define an enhanced solution to facilitate provision of valid consensus information such that one or more of the above disadvantages are alleviated. The objects of the invention are achieved by an information system, a server system, a method, and a computer program product, which are characterized by what is stated in the independent claims. The preferred embodiments of the invention are disclosed in the dependent claims.

The invention is based on the idea utilizing an information system where a plurality of users are able to access information in a remote database. The database stores a plurality of predefined factors that describe the points of interest relevant in the operational environment. The factors are organized into a hierarchic structure and advantageously equipped with means for monitoring their timely validity. The information system is arranged to operate reciprocally, i.e. when a participator provides an opinion on a factor, collective information on the other participators opinions on the same factor is made available to him.

An advantage of the invention is that it provides a new enhanced tool for collecting and distributing consensus information. The generalized group of factors allows an individual user to reflect his subjective opinion on the points of interest, and the advanced reciprocity mechanism enables focussing on subjects relevant to him or her. Correspondingly, through the continuous nature and reciprocity the topics may be focussed more accurately to issues of interest. The solution promotes timely provision of new assessments and improves directly the validity of continuously available consensus information.

BRIEF DESCRIPTION OF THE DRAWINGS

In the following the invention will be described in greater detail by means of preferred embodiments with reference to the attached drawings, in which

FIG. 6 illustrates an example of an individual user view;

FIG. 8 shows an example of a polyadaptive attribute matrix corresponding to the information structure of FIG. 6;

FIG. 10 illustrates an example of a subscriber record.

DETAILED DESCRIPTION OF THE INVENTION

The present invention can be applied to any information system where a plurality of users may access information stored in a remote database. The present invention is especially applicable to a client/server infrastructure without, however, excluding the centralized infrastructures of mainframe computers. The connection for implementing the access may comprise fixed or wireless connection, or a combination of each.

In the following, the invention is illustrated by means of an information system for collecting assessment information on one or more contractors from one or more participators, and for providing consensus information computed on the basis of the received assessments. A contractor represents an object of the assessment, and may thus be, for example, an entity (a company, an organization) or a consumable (product or service). A participator represents a party that, for some reason, has an interest in the company, and is therefore willing to provide opinion on the factors related to the contractor, and to access computed consensus information on such factors. Examples of participators in the present embodiment comprise investors, suppliers, customer, analysts, and the like. Such an information system is particularly applicable to research of subjective opinions on immaterial or immaterial factors, but for a person skilled in the art it is clear that the invented solution may, however, be advantageously applied to creation of any consensus information that is computed based on a plurality of assessments of interested entities. Due to translating the intangible factors into numerical data, the embodied information system allows parallel utilization of tangible and intangible factors, and thus enables providing a comprehensive conception of the evaluated target. Typically there are involved a plurality of contractors and participators and the relevance of the information on a contractor corresponds directly with the number of valid assessments thereof. The validity of consensus information, and thus the performance of the system are critically based on the efficiency of collecting assessments.

Figure 1:
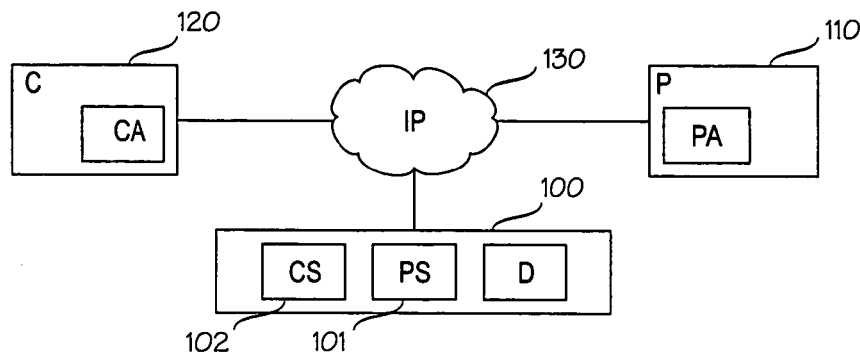
FIG. 1 illustrates the functional architecture of an information system according to an embodiment of the invention.

In the current embodiment the invention is illustrated with an information system employing client/server relationship, without restricting the scope of protection to the terms and physical elements used herein. Alternative models comprise, for example, master/slave, and peer-to-peer configurations. The essential requirement is, however, that the users of the information system may operate remotely and independently from their own terminals. The block chart of FIG. 1 illustrates the functional architecture of an information system according to an embodiment of the invention. The system comprises a server 100 and one or more clients 110, 120 mutually interconnected by means of network 130, advantageously, but not restricting to, a packet switched network.

An essential requirement for a system for collecting and distributing evaluated information is that it may be utilized by a plurality of users from distributed locations. In a network, the client/server model provides a convenient way to interconnect users that are distributed across different locations. A server 100 refers herein to a computer device that provides a service for other computers that are connected to it via a network. In the current embodiment, the connection between clients 110, 120 and the server 100 is performed by means of TCP/IP message passing over the IP network 130, and uses http or proprietary protocol to encode the client's requests and the server's responses. While TCP and IP specify two protocols at specific protocol layers, TCP/IP is used herein to refer to the entire protocol suite based upon these, including telnet, FTP, UDP and RDP. The server may run continuously (as a daemon), waiting for requests to arrive or it may be invoked by a higher level daemon controlling a number of servers.

The server 100 is configured with server processes 101, 102 corresponding to different types of clients. Client PA 110 illustrates a participator client for participator client processes, corresponding to which there exists an participator server application process PS 101. A participator is a party utilizing the offered service, i.e. the party providing the assessments and utilizing the resulting consensus information. Client CA 120 illustrates a contractor client for contractor client processes, corresponding to which there exists a contractor server application process CS 102. A contractor is a party upon which the assessments are made and to whom the resulting consensus information is also of utmost importance.

Figure 2:
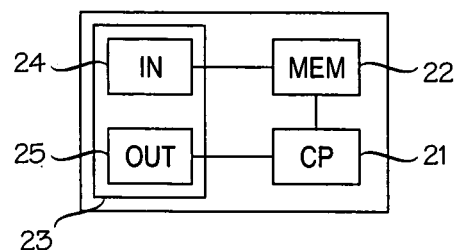
FIG. 2 comprises a functional description of an application server according to an embodiment of the invention.

The implementation of the described mechanisms and functionalities in the server is illustrated by referring to FIG. 2 that comprises a functional description of the application server 100. The network node comprises processing means 21, an element that comprises an arithmetic logic unit, a number of special registers and control circuits. Connected to the processing means are memory means 22, a data medium where computer-readable data or programs or user data can be stored. The memory means typically comprise memory units that allow both reading and writing (RAM), and a memory whose contents can only be read (ROM). The unit also comprises an interface block 23 with input means 24 for inputting data for internal processing in the unit, and output means 25 for outputting data from the internal processes of the unit. Examples of said input means comprise a plug-in unit acting as a gateway for information delivered to its external connection points. For receiving information from the user of the application server, the application server AS may also comprise a keypad, or a touch screen, a microphone, or the like. Examples of said output means include a plug-in unit feeding information to the lines connected to its external connection points. For outputting information to the user of the application server AS, they may also comprise a screen, a touch screen, a loudspeaker, or the like. The processing means 21, memory means 22, and interface block 23 are electrically interconnected for performing systematic execution of operations on the received and/or stored data according to the predefined, essentially programmed processes of the unit. In a solution according to the invention, the operations comprise functionality for implementing the operations of the server as described herein.

Figure 3:
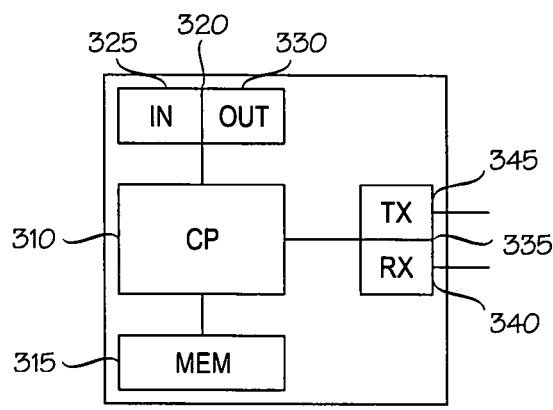
FIG. 3 comprises a functional description of a client workstation according to an embodiment of the invention.

The implementation of the described mechanisms in the client is illustrated by referring to FIG. 3 that comprises a functional description of a client workstation 110, 120. The workstation comprises processing means 310, an element that comprises an arithmetic logic unit, a number of special registers and control circuits. Connected to the processing means are memory means 315, a data medium where computer-readable data or programs or user data can be stored. The memory means typically comprise memory units that allow both reading and writing (RAM), and a memory whose contents can only be read (ROM). The workstation also comprises an interface block 320 with input means 325 for inputting data by the user for internal processing in the unit, and output means 330 for outputting user data from the internal processes of the unit. Examples of said input means comprise a keypad, or a touch screen, a microphone, or the like. Examples of said output means comprise a screen, a touch screen, a loudspeaker, or the like. The workstation also comprises a communication unit 335 configured with receiving means 340 for receiving information and processing it for inputting to the processing means 310, as well as with transmitting means 345 for receiving information from the processing means 310, and processing it for sending. The implementation of such a communication unit is generally known to a person skilled in the art. The processing means 310, memory means 315, interface block 320, and the communication unit 335 are electrically interconnected for performing systematic execution of operations on the received and/or stored data according to predefined, essentially programmed processes of the unit. In a solution according to the invention, the operations comprise the functionality of the client workstation as described above.

A second aspect of validity is the relevance of the assessment, i.e. whether the assessment vested on concentrates on factors and objects that are essential to the assessor and/or to the business in question. This is solved by a hierarchical information structure and a controlled reciprocity mechanism that in an effective combination simultaneously provide a holistic perspective to relevant factors in the applied business environment and allow adjustment according to the scope of interest of the participator in question, without, however, compromising the relevance of the consensus information.

Figure 4:
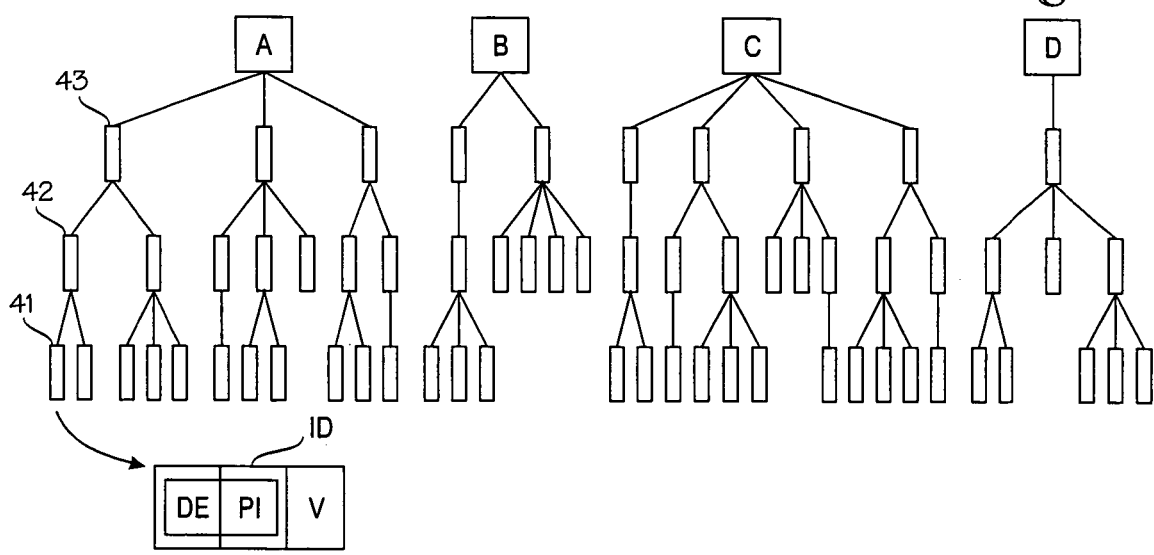
FIG. 4 the information structure applied in the present embodiment of the invention.

FIG. 4 illustrates the information structure applied in the present embodiment. As an example, the embodiment is shown in the context of an information system for generating consensual information on non-financial value drivers of listed companies to the equity market. For the primary actors in the equity markets, the analysts, investors and listed companies, the true relevance of intangibles in the assessment of businesses has become more and more important. However, for the time being there is no framework for creating, collecting, analyzing, comparing and distributing information on the intangible operational value drivers.

One of the major obstacles for creation of such information system has been the lack of standardized attributes for describing the relevant intangible points of interest. The few questionnaires in the market typically provide their own list of questions, with different scopes and emphasis. Scattered inquires flowing in on a regular basis have not encouraged the analysts to spend the time and energy to familiarize themselves with the questions, factors and mechanisms related to a new type of questionnaire, and then input a great deal of facts and figures reflecting their personal opinions on them. This is especially the case when there is not much certainty that the number of respondents, or the extent of their answers would reach a limit where a consensus truly becomes out, i.e. reflects the agreement in the judgment or opinion reached by a group as a whole. Often also merely a part of the companies are of true interest to the assessing analysts. In order to increase the interest of the participators, they have been coaxed with gifts and lotteries as a quid pro quo for returned answers. It is clear, however, that for people of profession such inducements are often not that relevant. On the other hand, it is equally clear that a tool that would provide consensus information on-line, on a continuous basis, with secured validity and to the extent relevant for the participator would be a huge inducement for participating and thus enhancing the operation of the information system in itself.

A basic element of the embodied information structure is a factor F 41. A factor F refers to assessment information on one unique point of interest and comprises an identity field ID that is predefined by the operator of the information system, and one or more value fields V for values derived for the assessed point of interest. The identity field ID comprises a descriptor part DE and a position indicator PI part. The descriptors DE are predefined for the current contractor group by the operator of the information system and are utilized as such for each of the contractors. The position indicators PI comprise rules, values of characters, based on which the position of the attribute in the layered hierarchic structure may be defined. For example, the position indicator may comprise a reference to a parent factor the current factor is subordinated to. Through the description part D the factor F is advantageously associated with a verbal definition that, as such, clearly defines the characteristic of a factor to the users of the embodied information system. The one or more values in the value fields V carry the evaluation assigned to or computed for the factor F. In the embodied system, the factors homogenize the conception of the points of interest with respect to a plurality of contractors and participators, especially in continuous, recurring use. On the other hand, the factors can be flexibly adapted to a particular application area and for different types of contractors.

FIG. 4 illustrates an exemplary matrix of predefined factors applicable to one group of contractors. The factors are organized into a hierarchical structure, wherein one or more factors 41 forms a factor group 42, which again is a member of a higher-level group 43, and so forth. Each member of any group is a factor and the total depth of the hierarchical structure corresponds to the number of levels of groups on top of the other, when all the predefined factors are taken into account, and each level of groups 42, 43 corresponds to a layer in the hierarchical structure. The use of position indicators PI allows directing operations controllably either to individual factors or to members of hierarchical layers individually.

Figure 5:
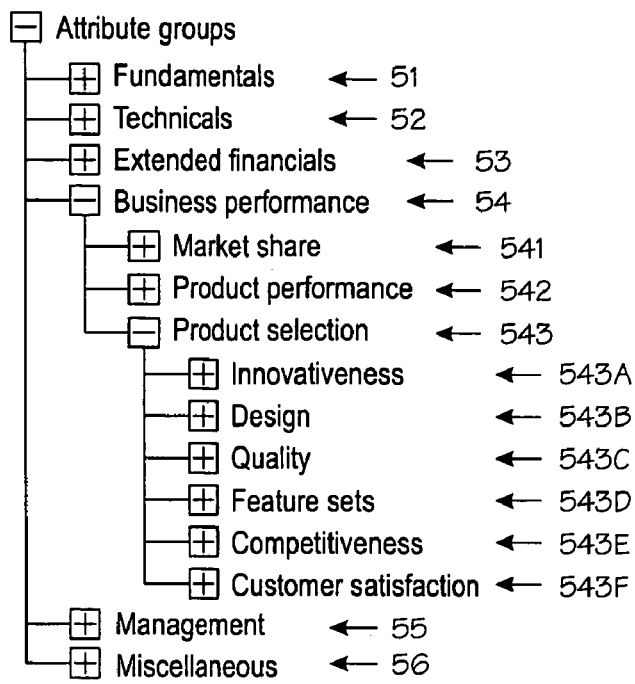
FIG. 5 illustrates an example of the hierarchical information structure in the context of assessing listed companies.

FIG. 5 illustrates an example of the correspondence between the hierarchy of the factors and the layers of the hierarchical attribute matrix by an example of an industrial application for generating consensual information on non-financial value drivers of listed companies to the equity market.

The first level of factors of the exemplary assessment is related to the identification of the Company 5. The next level of factors comprises six main groups of Fundamentals 51, Technicals 52, Extended financials 53, Business performance 54, Management 55, and Miscellaneous 56, the position indicator of each factor comprising a reference to the parent factor Company 5. The main group Business performance 54 is further divided into three subgroups: Market share 541, Product performance 542, and Product selection 543, the position indicator of each factor comprising correspondingly a reference to the parent factor Business performance 54. The subgroup Product selection 543 divides further into six subgroups Innovativeness 543A, Design 543B, Quality 543C, Feature sets 543D, Competitiveness 543E, Customer satisfaction 543F, the position indicator of each factor comprising correspondingly a reference to the parent factor Product selection 543.

Now, for example, a point of interest of the market performance of the assessed company in general, i.e. how the market share is divided, how have the products performed, how does the product selection look like in the competitive terms, may be assessed by a value given to a factor Business performance. The identity field of the factor comprises the descriptor "Business performance" 54 and reference to the parent factor "Company" 5, which positions the attribute to the second highest layer in the matrix. By submitting a value '8', the user may evaluate the business performance of the Company to be satisfactory.

At will of the user, the assessment of this factor may, however, be brought into a deeper level by analyzing separately the particular aspects of the factor. Thus a point of interest of the competitiveness of the selection may be assessed by a value given to the factor Product selection 543. The parent factor to the factor Product selection 543 is the factor Business performance 54, whose parent is the factor Company 5. This positions the attribute Product selection 543 to the third highest layer in the matrix. Analogously, attributes subgroups Innovativeness 543A, Design 543B, Quality 543C, Feature sets 543D, Competitiveness 543E, Customer satisfaction 543F provide voluntary means for even deeper analysis on this particular aspect of the value driver.

The number of layers applied corresponds to the dimensions of the factor matrix, and the level of analysis may thus be selected and managed automatically at identification of the factor. Furthermore, the decision whether to open a group for more detailed assessment is available to the user at every layer.

In the present embodiment, a session is initiated by a participator logging into the system by downloading the start page from the server to his browser, and providing appropriate user credentials. As an advantage to the conventional systems, where provision of answers is restricted to a defined period, within the client/server relationship, the session may take place anytime, and from any place where a connection to the server may be established.

In order to serve a largest possible group of participators, the number of observed entities, here contractors, is preferably maintained on a high level. On the other hand, a participator is typically interested only on a restricted subgroup of the entities, and conventional tables comprising a plurality of uninteresting companies within a group of interesting ones easily fend off potential participators. In the embodied information system the participator in each session may define an individual assessment input that is taken into consideration in provision of consensus information to him or her, without, however, compromising the usability and relevance of the cumulative consensus information collected to the database.

The combination of factors and values input within one session are hereinafter referred to as a trace. The block chart of FIG. 6 illustrates the factors of an exemplary trace in the embodied information system. The trace is automatically generated through the user's choices during the session. The highest level of the trace corresponds to the choice of the highest level of factors. In exemplary choice of FIG. 6, of all the main groups A, B, C, D, the participator decides to assess factors in main groups A, B, and C (marked with black colouring). This means that none of the subgroups of the main group D are included in the trace of the session. On the second layer the user decides not to leave out any subgroups, but on the second level decides to leave out two factors 61, 62 of the third subgroup of main group C, and the first sub-group 63 of the first subgroup of the main group A. With this choice the lower layer factors 64 and 65 are automatically left out. The participator further chooses not to provide assessment for third layer factors 66, 67, 68, and 69, which are thus left out of the trace. Through these choices, where the user submitted values only to factors relevant to him, a trace (marked with white boxes) was created for that particular session.

Advantageously the user interface of the client workstation is configured to provide the user with a display that follows the hierarchical structure of the factors. For example, the display may be configured to show factors in such a way that factors of the same layer are vertically aligned, as shown in FIG. 5. Subsequently, the relationship to the higher level attributes may be illustrated in the display by connecting lines, intentions, etc.

In its simplest form an assessment comprises a step of assigning one or more numeral values to one or more factors. Correspondingly assessment of a contractor comprises assigning numerical values to the factors, based on their personal view on the current status of the points of interest in the contractor. For a person skilled in the art it is clear that a variety of metrics and related scales and ranges may be employed in assessments without deviating from the scope of the current invention.

Figure 7:
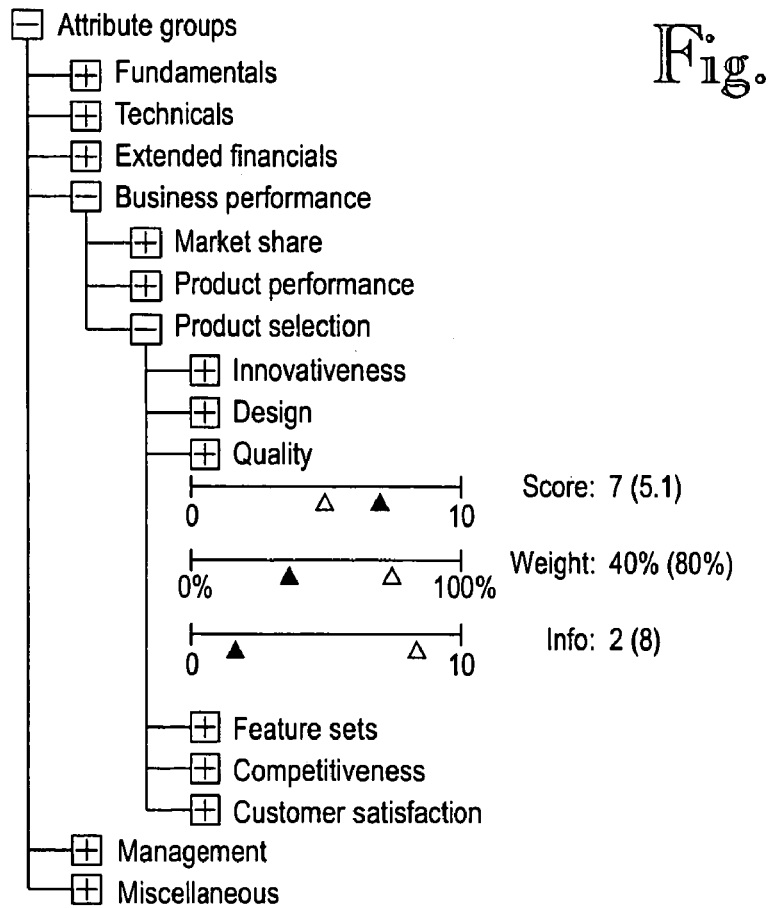
FIG. 7 illustrates the information structure of FIG. 5 with three exemplary metrics.

In the embodied system the assessment is made by means of numerical values. The embodiment is, however, further enhanced by provision of more than one metrics for each factor. FIG. 7 illustrates the information structure of FIG. 5 shown with three exemplary metrics employed in the embodied assessment. The first metric is denoted as the score S and corresponds to a mark in the range of 1-10. The second metric is denoted as the weight W and corresponds to the relative weight of the factor in question in relation to the other factors within the same group, in the range of 1-100%. The third metric is denoted as info I and gauges the level of knowledge the participator perceives to possess on the factor in question, in the range of 1-100%. The use of more than one metric provides an inherent averaging mechanism that provides applied perspectives to the utilization of consensus information, as will be discussed later.

Numeral values assigned to the metrics allow the participators to reflect their subjective opinion on the factors, and the generalized group of factors provide a framework that allows a controlled degree of freedom, which works in both ways: the input is collected efficiently in a standardized format but an individual user may focus only on subjects relevant to him or her. The values in the trace may be pre-processed in the user end or the values may be sent as such to the server to be processed into an assessment input. In the assessment input, grades of a group of attributes are processed into a grade of a lowest subgroup and grades of each of the lower subgroups are processed into grades of a higher subgroup, and the procedure is continued hierarchically upwards until a grade is available for each attribute and group in the layers of the trace. In its simplest form processing comprises averaging of the attribute values to a consensus value of the lowest subgroup and averaging the consensus values of each lower subgroup into the grade of the higher subgroup. In the embodied system, the grade values are multiplied with the weight and information values, and this figure is used as a consensus value of the factor. For a person skilled in the art it is clear that other computation methods are applicable without deviating form the scope of protection. As a result of processing, a trace comprising the assessed factors and values given is produced. A computation is performed with the total consensus values of the factor matrix and the personal consensus values of each of the factors in the trace and the updated consensus values for the factors are stored into the database.

As discussed above, the key motivator and incentive for participators to engage in this type of information sharing is that they are offered valuable information in return. In the invented solution this valuable information is called as reciprocal consensus information (RCI), which refers to the mechanism that, reciprocally, the participator will be provided with information only on factors for which that he or she has submitted values for. RCI thus relates to a concept where, when a participator provides an opinion on a factor, collective information on the other participators opinions on that same factor is made available to him. In FIG. 7, the white triangles and the figures in parenthesis represent, as an example, the current consensus values that have been become available to the participator after he or she has first provided his or her view on the topic. For a person skilled in the art that the format of displaying the reciprocity is not relevant for the current invention. In order to be able to define the RCI for the participator, cumulative information on participator's submitted traces is maintained in the database of the server by means of a polyadaptive attribute matrix. The polyadaptive attribute matrix refers here to the dynamically changing matrix for the consensus values of the factors, continuously computed on the basis of the input records received from individual users, and made accessible to each user in a controlled reciprocity according to the traces submitted by him.

FIG. 8 shows a hypothetical two-dimensional example of the extent of user's traces in consecutive assessment inputs to a polyadaptive attribute matrix. Each item of the polyadaptive attribute matrix comprises a consensus value $R_i$ computed for the factor from the values received in the plurality of traces from all users as described above. Additionally, for each consensus value of a factor, a consensus number $N_i$ is calculated, based on the cumulative number of traces where a value for this particular factor is given.

The basic principle of the RCI of an individual participator is that it corresponds directly with his or her personal inputs; a cumulative trace generated on the basis of traces in consecutive assessment inputs of the participator. This means that the more factors the traces of the participator cover, the broader view to the consensus values will be available to the participator. This is illustrated in FIG. 8 by means of two separate assessment inputs of one participator. In time T1, for example on a busy day, the participator feeds in a new trace AI1, merely reflecting some recent news he or she has recently learned. In time T2, the participator has more time and chooses to go through a number of factors, including his earlier inputs, and check whether his views have, in the course of time, altered. In this session, a broader trace AI2 is generated. The traces AI1, AI2 of these partly overlapping assessment inputs are combined into a collective trace TR=AI1∪AI2, and the RCI is implemented by allowing to the party access to view all consensus values (dashed in FIG. 8) of the polyadaptive attribute matrix that correspond to the collective trace of the user.

It is clear that the total number of assessments from all users on an item corresponds directly with the relevance of the consensus, and therefore the consensus number may advantageously utilized in providing consensus values for the users. The operator may generate one or more consensus rules that further define a valid consensus. For example, it may be defined that as long as $N_i < TL_i$, where $TL_i$ is a defined trigger level, a true consensus is not recognized. In such case, the consensus value is either not included in the RCI accessible to the user or is, for example, arranged to be displayed differently than the recognized consensus results. Separate consensus rules may be defined for each group or layer of the polyadaptive attribute matrix.

A third aspect to the validity of information is the lifetime of the information. In the conventional questionnaires the responses are processed at the same time, and the lifetime of the information begins to run right after the end of the term for responding. The information will not be updated before the release of new questionnaire, and in the course of time the topicality of the consensus deteriorates. The only way to control the rate of updating the information in the conventional systems is thus by the frequency of sending out the updates. Since answering a questionnaire is a laborious task, the rate of consecutive questionnaires must, on the other hand, be kept on a moderate level. In the following embodiment of the invention, the validity of the RCI is enhanced by means of a reciprocity expiration mechanism, through which the timely validity of the information may be improved, and provision of continuous service is enabled.

In the following, the mechanism is illustrated by referring to FIG. 8. For each participator the server is configured with a functionality for defining and maintaining a RCI-window. This RCI-window may be used to control whether a value in the polyadaptive attribute matrix is accessible to the user or not. The elements of the RCI window each correspond to a combination of elements of the polyadaptive attribute matrix, and have two possible states: OPEN and CLOSE, (marked correspondingly as o and c in FIG. 8). When the element of the RCI-window is OPEN the consensus value corresponding to that element is accessible to the user, and when the element of the RCI-window is CLOSED the consensus value corresponding to that element is not accessible to the user.

The state of the elements in the RCI-window is determined on the basis of a reciprocity expiration factor (REF). Initially all the elements in the RCI-window of the polyadaptive attribute matrix for the participator are CLOSED. Each time a participator provides a trace comprising a particular factor, an element of the RCI-window that corresponds to the factor is updated to OPEN state. Through this transition, the participator gets access to the consensus values of the factors in the trace, as described above. Each time a participator inputs a new trace, the REFs of the elements that correspond to the combinations of attributes in the trace, are also reset. After reset the REF is being updated, either continuously based on one or more update rules, or by the operator, in response to some sudden changes in the operative environment. The state of an element in the RCI-window is determined based on the current value of its REF, whereby at updating a REF of an element may reach a predefined threshold value. In this case the state of the element changes to CLOSED, and the user is no longer able to access the corresponding consensus value in the polyadaptive attribute matrix.

Updates on the value of REF of a factor may be based on, for example:

The period since the last assessment input

The number of times the consensus value of the factor has been presented to the participator The number of times the consensus value of the factor has been assessed by other participators since the last assessment from the participator Dramatic, statistically relevant change in the consensus value of the factor in the polyadaptive attribute matrix Dramatic, statistically relevant change in the contractor side Relevant new information released by a contractor Other unspecified external event or change that, by the service provider, is deemed relevant in this respect.

The update rules may be mutually interconnected or independent. One rule may be arranged to drive the REF beyond the threshold, or alternatively, a combined effect of several rules may be required to trigger the transition of an RCI-window element to the CLOSED state.

With reference to the example of FIG. 8, at time T2 the RCI-window element of factor 81 is updated to OPEN state and the REF of the element is reset to an initial value of 100 points. After time T2, the REF is being updated by deducting points P1, P2, P3, P4, P5 derived from calculations according to the following rules. When the updated value of REF goes negative (threshold=0), the RCI-window element for factor 81 is closed.

$$P1 = N*M$$

where N corresponds to a predefined number of points per day, and M corresponds to a number of days since the last trace that comprised a record related to factor 81, $$P2 = O*R$$

where O corresponds to a predefined number of points to be deducted per a time the consensus value for this factor is accessed by the participator, and M corresponds to a number of times the participator has accessed the consensus value of factor 81, $$P3 = S*T$$

where S corresponds to a predefined number of points per update to this factor by another participator, and T corresponds to a number of times the factor 81 has been included in a trace of another participator since the last update by the participator, $$P4 = U$$

where U corresponds to a number of points estimated appropriate by the operator to reflect the dramatic change in the operating environment.

For a person skilled in the art it is clear that other equations and mechanisms for determining the REF and defining the triggering of the state transition are possible. Furthermore, the number of rules and/or parameters may be varied freely without deviating from the scope of the present invention. The parameters may be employed separately or in conjunction of each other.

Through the reciprocity expiration factor, the operator may control the rate of updates on the polyadaptive matrix. For example, the operator may choose to expedite the expiration of the elements in the RCI-windows of the participators, in response to fresh news on a contractor. The expiration of the information induces the participators to update their assessments sooner than otherwise anticipated, and thus decreases the probability of obscure information in the polyadaptive attribute matrix. This directly enhances the timely validity of the information in the database.

The service implemented through the information system is valuable to the contractor side already as such, i.e. from the perspective of the contractor acting as a participator. On the other hand, the performance of the system may be further enhanced with additional means for serving the needs of the contractors. Firstly, the system may be equipped with additional filtering means in order to eliminate, for example, deliberate attempts to bias the consensus. Such means may comprise, for example, a filter unit arranged to disqualify input values that deviate from the consensus value with a percentage greater than a predefined threshold.

The information system allows the operator to actively follow the information sources related to the assessable entities, and act whenever deemed appropriate. On the other hand, the methodology of reciprocity may be optimally utilized to enhance the operation of the information system in the contractor side as well. The operator may configure the server with secondary reciprocity means configured to operate so that a contractor, who actively submits press releases comprising information relevant in view of one or more factors of the polyadaptive attribute matrix, is in response to the voluntary inputs, allowed access to consensus values of those factors for a defined period. The definition on the extent of reciprocity may be implemented by means of rule processor that correlates a voluntary submission of a contractor to a specific RCI-window. For example, a listed company may, through its own user account, submit information on its new revolutionary product. In response to this piece of information, the rule processor sets elements in the contractor's RCI-window to OPEN access to consensus information on factor 543 Product selection (FIG. 5). At the same time the rule processor resets the REF, that will thereafter expire within a limited time interval. This secondary reciprocity mechanism in the contractor side, will induce increased activity in assessments, accelerate the update rate of the information input, and therefore improve the overall performance of the information system.

Figure 9:
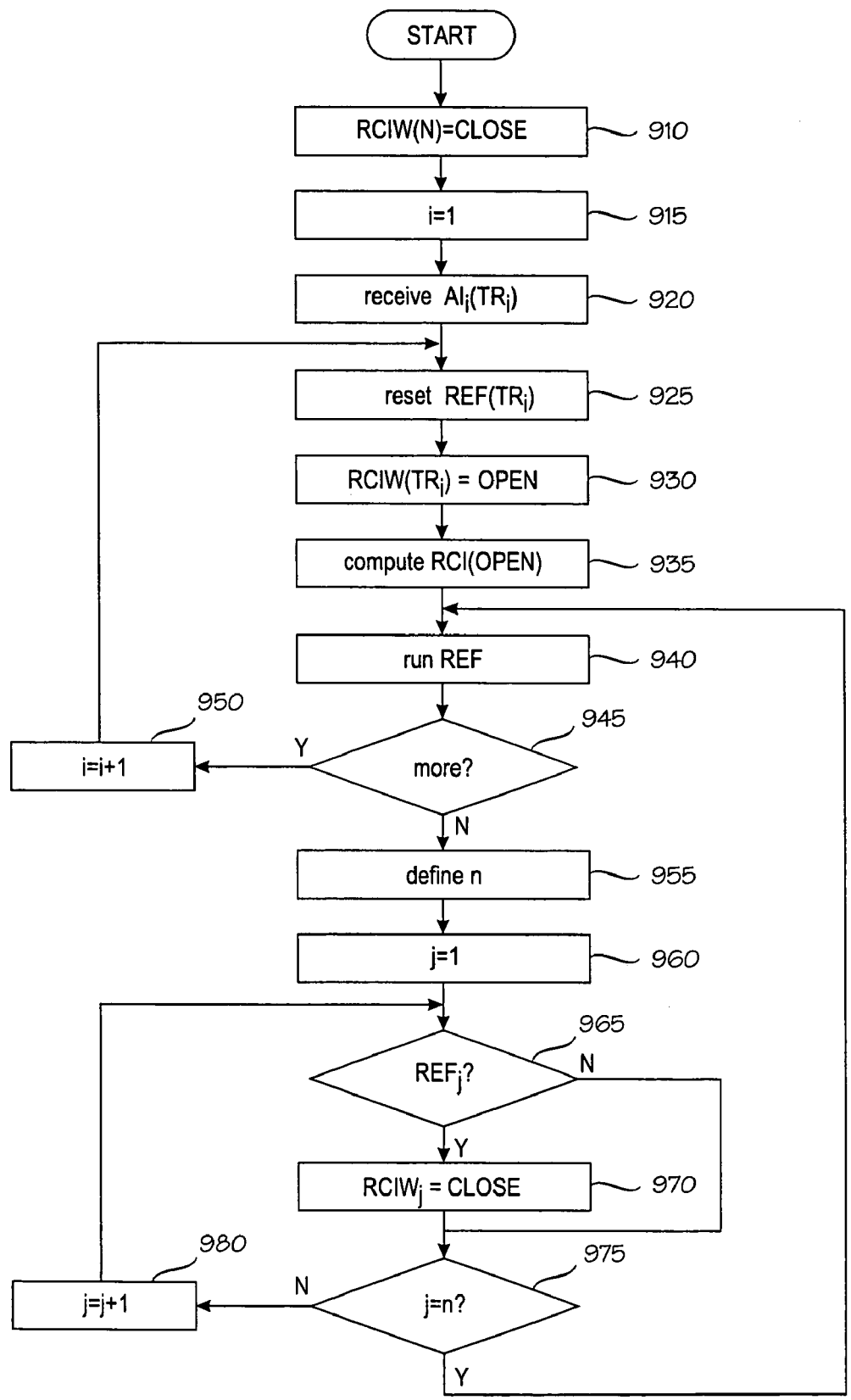
FIG. 9 illustrates an embodiment of a method according to the present invention.

Referring to the embodiments above, the flow chart of FIG. 9 illustrates an embodiment of a method according to the present invention. FIG. 9 shows a procedure followed in consecutive sessions of one participator. Step 910 begins in the initial state of the information system where a database comprises a polyadaptive attribute matrix of N elements. Initially, the RCI-window RCIW of the participator for each of the N elements is in the CLOSED state. In step 915 the procedure is initiated by initializing the trace counter i for counting the number of traces submitted by the participator. In step 920 the participator sends in a trace $TR_i$ as described in connection of FIG. 6. The trace $TR_i$ comprises a number of records, each corresponding to a factor identified by a combination of attributes in the record. In step 925 the reciprocity expiration factor of the elements in the RCI-window RCIW corresponding to these factors is reset. Correspondingly, in step 930 the elements of the RCI-window of all these factors is set to OPEN. New consensus values are computed based on the earlier stored values in the polyadaptive attribute matrix and on the values in the trace $TR_i$ and updated to the polyadaptive attribute matrix according to the computations (step 935). After this the updated consensus values with whose RCI-window elements are OPEN are available to be accessed by the participator.

The updating of REF values will start right after their reset (step 940) according to the predefined rules and/or parameters, as described in connection of FIG. 8. The system checks (step 945) whether the participator has input another trace, and if yes, increments the trace counter i (step 950), and returns to step 920. If no new trace is received, the system will continue by monitoring the expiry of the reciprocity information. This is initiated by first determining the cumulative number n of elements currently OPEN (step 955) in the RCI-window. After this the element counter j is initialized (step 960). By means of j the system will go through all n elements and check (step 965) whether the expiration rule for the RCI-window element is met. If yes, the RCI-window element of the factor is closed (step 970). If not, the procedure will move to step 975 where it is checked whether all n elements have been checked. If not, the element counter j is incremented (step 980) and the procedure returns back to step 965. If yes, the procedure returns back to step 935.

As discussed above, the increase of dimension increases the variety of results derivable from the consensus information. This is illustrated with the metrics described in the embodiment of FIG. 7. In the embodied example, the consensus value C of a factor of a particular user in the polyadaptive value matrix is a product of the three different values entered for the factor by the participator, the score value S, the weight value W, and info value I, ($C=S*W*I$).

In addition to contributing to the consensus value, the different dimensions are applicable for separate calculations, each indicative of the type of value they represent. For example, the system may comprise functionality for calculating, from the group of all score values S, a consensus value for the score value $C_s$. Similarly, the system may comprise functionality for calculating, from the group of all weight values W, a consensus value for the weight value $C_W$, or from the group of all info values I, a consensus value for the info value $C_I$. These consensus values provide different views to consensus information, however, collected and made available according to the principles of the present invention. Furthermore, the system may comprise further functionalities for calculating variances, trends, etc. of the values of one dimension. The results of these scoped calculations provide a view to, for example, how unanimous the participators are or are not, or how have their opinions evolved within a defined time period. The consensus value of weight values $C_W$ provides means for developing the system by discarding the attributes that constantly receive low weight values. The consensus value for the info value $C_I$ provides means for the contractors to identify possible lapses in their corporate communications: if a company sees that an attribute modelling a factor that they themselves consider as one of their major competitive edges constantly gets low consensus value for the info value $C_I$, they may choose to initiate a campaign to improve the general awareness of the factor.

The different metrics also provide a further means for the operator of the system to control the validity of the factors. The operator may continuously poll the incoming trances and consensus values, and deem that a factor whose weight is consistently estimated to be vary low may be discarded from the matrix. This mechanism provides a way to improve the validity of the factors throughout the continuous operation.

A further view to the consensus information is to combine each consensus value to one or more fields of the subscriber information. FIG. 10 illustrates an example of a subscriber record comprising following fields: userid, usergroup, and nat. The field userid stores the unique user identification assigned to the user. When registering to the information system, the users may be further requested to assign themselves to a user group, for example, 'banker', 'analyst', 'broker', etc. The field usergroup is thus used to store an acronym representing the group that the user belongs to. Similarly, the user may be requested to input his or her nationality, and the field nat is thus used to store an acronym representing the nationality of the user. A combination of a dimension of the consensus values and a particular field in the user information again creates an interesting result that may be employed by the contractors and/or the participators. For example, a contractor may wish to know how much weight do the US participators give to the factor 'academic degree of the top management'. This may be computed from the consensus value of weight values $C_W$ of the users whose field nat comprises acronym 'USA'. The operator may define such computations to be made available on a continuous basis, or generate them at request as a specially deliverable service.

The available consensus values may be utilized to further improve the validity of the consensus information in respect of the personal preferences of the participators. The server may be configured to allow participators to search contractors according to self-generated rules on the consensus values and thus segment the companies according to the aspects they themselves consider important. For example, an analyst may consider that, in his or her opinion, in the field of the current set of contractors, the efficiency of the logistic chain is one of the most valuable value drivers. Accordingly, he or she generates a search criteria that identifies all companies whose consensus value for a factor related to logistic chain exceeds a defined threshold value. Subsequently, he may take the group of such companies under closer inspection.

In the above, the present invention is described in the operational context of equity markets and assessments on companies. For a person skilled in the art it is clear that the invented solution is applicable to any operational environment, where the personal perceptions have relevance. It will be obvious to a person skilled in the art that, as the technology advances, the inventive concept can be implemented in various ways. The invention and its embodiments are not limited to the examples described above but may vary within the scope of the claims.

The invention claimed is:

1. An information system having at least one computer device for providing collective consensus information on a plurality of contractors to a plurality of participators, the information system comprising:
   output means for presenting data from the information system in a manner perceptible by a participant;
   input means for inputting data from the participator in response to a view to a plurality of predefined factors arranged into a predefined hierarchical order, each factor corresponding to an assessable point of interest, said view presented to the participator through said output means;
   communication means for receiving one or more input values for one or more of the predefined factors from the participator;
   computation means for generating, for one or more factors, a computed consensus value on the basis of input values for the factor received from the participator;
   control means for controlling an extent of output of consensus values to the participator by way of said output means on the basis of one or more successive inputs by the participator, wherein
   factors are associated with two-valued variables,
   the control means further comprise
      an expiration factor for controlling the value of the two valued variable, and
      a rule processor for updating each expiration factor according to one or more expiration rules, and resetting the expiration factor every time a new value for the factor associated with the two-valued variable is received from the participator.

2. An information system according to claim 1, wherein the rule processor is arranged to progress expiry with time.

3. An information system according to claim 1, wherein the rule processor is arranged to progress expiry every time the consensus value is accessed by the participator.

4. An information system according to claim 1, wherein the rule processor is arranged to progress expiry in response to an input signal from an operator.

5. A server element for providing results computed on the basis of values received from a plurality of independent information sources connected to the server element, comprising:
   a processor;
   a database, operating on a computer system, having (i) a plurality of records, resident on a computer storage medium, that correspond to a plurality of predefined interrelated factors, each record comprising an identity field for identifying the factor, the identity field of the factor having a position indicator for indicating the subordinate relationship of the factor to at least one of the other factors, and (ii) a result value computed from the input values related to the factor received from one or more terminals; and
   a computer server comprising
   a receiving unit configured to receive one or more input records from the one or more terminals, an input record comprising identification of the factor and at least one input value related to the factor,
   a computing unit configured to compute a new result value on the basis of the current result value of the factor and the value of the factor received in the input record,
   a storing unit configured to store the new result value to the database, and
   a control unit configured to, in response to the received input records, open to the user access to (i) the result values of the factors identified in the input record and (ii) the result values of the factors in superordinate relationship with the factor, and close from the user access to the result values of the factors not identified in the input record,
   wherein the control unit comprises a two-valued variable associated with each factor, the first value of the variable being associated with opening the result value to the user and the second value being associated with closing the result value from the user, and
   wherein the control unit comprises
   an expiration factor associated with each two-valued variable for controlling the value of the two valued variable, and
   a rule processor configured to (i) update each expiration factor according to one or more expiration rules, and (ii) reset the expiration factor every time a new value for the factor associated with the two-valued variable is received from the user.

6. A server element according to claim 5, wherein the computer server is connected to the plurality of terminals via an IP network.

7. A server element according to claim 5, wherein the rule processor is arranged to progress expiry with time.

8. A server element according to claim 5, wherein the rule processor is configured to progress expiry every time the consensus value is accessed by the user.

9. A server element according to claim 5, wherein the rule processor is configured to progress expiry in response to an input signal from the operator.

10. A server element according to claim 5, wherein the computer server further comprises a threshold value corresponding to a predefined minimum number of received input records required for establishing a consensus.

11. A server element according to claim 5, wherein the connection unit is configured to indicate separately result values for which the threshold value is not exceeded.

12. A server element according to claim 5, wherein for each factor there is arranged three different input values, and the result value corresponds to a consensus value calculated as a product of all the three input values.

13. A method for providing collective consensus information on a plurality of contractors to a plurality of participators, the method comprising:
   providing at least one participator with a view to a plurality of predefined factors arranged into a predefined hierarchical order, each factor corresponding to an assessable point of interest;

receiving one or more input values for one or more of the predefined factors from the at least one participator from an input device;

generating one or more computed consensus values for the one or more predefined factors on the basis of input values for the one or more predefined factors received from the at least one participator;

outputting the one or more computed consensus values as perceivable information to the at least one participator through an output device; and controlling the extent of output of the one or more computed consensus values on the basis of one or more successive inputs by the at least one participator, further comprising:

associating factors with two-valued variables;

associating with each two-valued variable an expiration factor for controlling the value of the two valued variable, updating each expiration factor according to one or more expiration rules, and resetting the expiration factor every time a new value for the factor associated with the two-valued variable is received from the user.

14. A method according to claim 13, further comprising progressing expiry with time.

15. A method according to claim 13, further comprising progressing expiry every time the consensus value is accessed by the participator.

16. A method according to claim 13, further comprising progressing expiry in response to an input signal from an operator.

17. A method for providing collective consensus information on a plurality of points of interest to a plurality of participants, the method comprising:

providing access to a database operating on a computer from one or more terminals, the database having a plurality of records stored on a computer-readable storage medium that correspond to a plurality of predefined interrelated factors, each record having (i) an identity field for identifying the factor, and (ii) a result value computed from the input values related to the factor received from the one or more terminals, the identity field of the factor having a position indicator for indicating the subordinate relationship of the factor to at least one of the other factors;

receiving from a user through an input device one or more input records, an input record having an identification of a factor and at least one input value related to the factor;

computing and storing in the computer-readable storage medium of the database a new result value on the basis of the current result value of the factor and the value of the factor received in the input record;

in response to the received input records, opening to the user access to the (i) result values of the factors identified in the input record and (ii) the result values of the factors in superordinate relationship with the factor, and closing from the user access to the result values of the factors not identified in the input record;

transmitting result values opened to the user to the terminal of the user; and outputting the retrieved result values to the terminal of the user in a manner perceivable by the user;

associating with each factor a two-valued variable, the first value of the variable being associated with opening the result value to the user and the second value being associated with closing the result value from the user, further comprising associating with each two-valued variable an expiration factor for controlling the value of the two valued variable, and updating each expiration factor according to one or more expiration rules, and resetting the expiration factor every time a new value for the factor associated with the two-valued variable is received from the user.

18. A method according to claim 17, further comprising progressing expiry with time.

19. A method according to claim 17, further comprising progressing expiry every time the consensus value is accessed by the user.

20. A method according to claim 17, further comprising progressing expiry in response to an input signal from the operator.

21. A method according to claim 17, further comprising comparing the number of received input records for a factor to a threshold value, said threshold value corresponding to a predefined minimum number of received input records required for establishing a consensus for a factor.

22. A method according to claim 21, further comprising indicating separately result values for which the threshold value is not exceeded.

23. A method according to claim 17, further comprising inputting for each factor three different input values, and computing the result value as a product of all the three input values.

24. A computer program product, recorded on a computer-readable storage medium and executable in a server computer connected to a database, the database comprising a plurality of records that correspond to a plurality of predefined interrelated factors, each record comprising an identity field for identifying the factor, and a result value computed from the input values related to the factor received from the one or more terminals, the identity field of the factor comprising a position indicator for indicating the subordinate relationship of the factor to at least one of the other factors, wherein execution of the computer program product in the server computer causes the server computer to:

receive from a terminal one or more input records, an input record comprising identification of a factor and at least one input value related to the factor;

compute a new result value on the basis of the current result value of the factor and the value of the factor received in the input record and store the new result in the database;

in response to the received input records, open to the user (i) the result values of the factors identified in the input record and (ii) the result values of the factors in superordinate relationship with the factor, and close from the user the result values of the factors not identified in the input record, wherein a two-valued variable is associated with each factor, the first value of the variable being associated with opening the result value to the user and the second value being associated with closing the result value from the user, an expiration factor is associated with each two-valued variable for controlling the value of the two valued variable, each expiration factor is updated according to one or more expiration rules, and the expiration factor is reset every time a new value for the factor associated with the two-valued variable is received from the user.

* * * * *